(12) United States Patent
Bojer

(10) Patent No.: US 9,799,952 B2
(45) Date of Patent: Oct. 24, 2017

(54) FILTERING ANTENNA SYSTEMS, DEVICES, AND METHODS

(71) Applicant: wiSpry, Irvine, CA (US)

(72) Inventor: Jorgen Bojer, Vadum (DK)

(73) Assignee: WISPRY, INC., Irvine, CA (US)

( * ) Notice: Subject to any disclaimer, the term of this patent is extended or adjusted under 35 U.S.C. 154(b) by 306 days.

(21) Appl. No.: 14/322,522

(22) Filed: Jul. 2, 2014

(65) Prior Publication Data

US 2015/0009079 A1     Jan. 8, 2015

Related U.S. Application Data

(60) Provisional application No. 61/842,206, filed on Jul. 2, 2013.

(51) Int. Cl.
*H01Q 1/50* (2006.01)
*H01Q 9/14* (2006.01)
(Continued)

(52) U.S. Cl.
CPC .............. *H01Q 1/50* (2013.01); *H01Q 9/145* (2013.01); *H01Q 9/42* (2013.01); *H04B 1/0057* (2013.01);
(Continued)

(58) Field of Classification Search
CPC ....... H04B 1/0458; H04B 1/18; H04B 1/0057
(Continued)

(56) References Cited

U.S. PATENT DOCUMENTS

| 8,154,460 B2 * | 4/2012 | Sakata | H01Q 1/243 343/702 |
|---|---|---|---|
| 8,736,511 B2 | 5/2014 | Morris, III | |

(Continued)

FOREIGN PATENT DOCUMENTS

| CN | 101356740 A | 1/2009 |
|---|---|---|
| CN | 101630773 A | 1/2010 |

(Continued)

OTHER PUBLICATIONS

Notice of Publication for European Application No. 14820319 dated Apr. 13, 2016.
(Continued)

*Primary Examiner* — Hoang Nguyen
*Assistant Examiner* — Awat Salih
(74) *Attorney, Agent, or Firm* — Jenkins, Wilson, Taylor & Hunt, P.A.

(57) ABSTRACT

The present subject matter relates to filtering antenna devices, systems, and methods in which a tunable antenna having one or more first variable impedance element is configured to selectively vary an impedance at a signal path output and a tunable filter is in communication between the signal path output of the tunable antenna and a signal processing chain. The tunable filter can have one or more second variable impedance element configured to provide a frequency-selective filtering response between the signal path output and the signal processing chain. A controller in communication with both the tunable antenna and the tunable filter can be configured for selectively tuning an impedance value of one or more of the one or more first variable impedance element or the one or more second variable impedance element.

22 Claims, 13 Drawing Sheets

(51) Int. Cl.
*H01Q 9/42* (2006.01)
*H04B 1/00* (2006.01)
*H04B 1/04* (2006.01)
*H04B 1/18* (2006.01)
*H01Q 1/24* (2006.01)

(52) U.S. Cl.
CPC ............ *H04B 1/0458* (2013.01); *H04B 1/18* (2013.01); *Y10T 29/49018* (2015.01)

(58) Field of Classification Search
USPC .................... 343/850, 860, 861, 750, 745
See application file for complete search history.

(56) References Cited

U.S. PATENT DOCUMENTS

| | | | |
|---|---|---|---|
| 2002/0183013 A1 | 12/2002 | Auckland et al. | |
| 2006/0290582 A1* | 12/2006 | Lee .................... | H04B 1/18 343/745 |
| 2010/0144292 A1 | 6/2010 | Kim | |
| 2010/0244576 A1* | 9/2010 | Hillan ................. | G06K 7/0008 307/104 |
| 2012/0007666 A1* | 1/2012 | David .................. | H03H 7/40 327/552 |
| 2012/0050122 A1* | 3/2012 | Wu ..................... | H04B 1/0458 343/745 |
| 2012/0169565 A1* | 7/2012 | Morris, III ........... | H03F 1/565 343/860 |
| 2012/0293384 A1* | 11/2012 | Knudsen .............. | H01Q 1/241 343/745 |
| 2013/0147681 A1* | 6/2013 | Spears ................. | H03H 7/40 343/861 |
| 2013/0225088 A1* | 8/2013 | Anderson ............. | H04B 1/18 455/62 |
| 2014/0120968 A1* | 5/2014 | Mahmood ............ | H01P 1/15 455/501 |
| 2014/0313088 A1* | 10/2014 | Rozenblit ............ | H04B 1/0458 343/745 |
| 2014/0355497 A1* | 12/2014 | Reiha .................. | G01S 19/13 370/281 |
| 2014/0375514 A1* | 12/2014 | Bakalski .............. | H01Q 9/0421 343/745 |
| 2015/0042525 A1* | 2/2015 | Yoshida ............... | H01Q 9/42 343/745 |

FOREIGN PATENT DOCUMENTS

| | | |
|---|---|---|
| CN | 103155431 A | 6/2013 |
| WO | WO-2013/089790 A1 | 6/2013 |
| WO | WO-2015/003065 A1 | 1/2015 |

OTHER PUBLICATIONS

Application No. PCT/US2014/045266 filed Jul. 2, 2014.
International Search Report for Application No. 2014/045266 dated Nov. 24, 2014.
Extended European Search Report for Application No. 41820319 dated Feb. 14, 2017.
IPRP with Written Opinion for Application No. PCT/US2014/045266 dated Jan. 5, 2016.
Chinese Office Action for Application No. 2014800374671 dated Apr. 18, 2017.

* cited by examiner

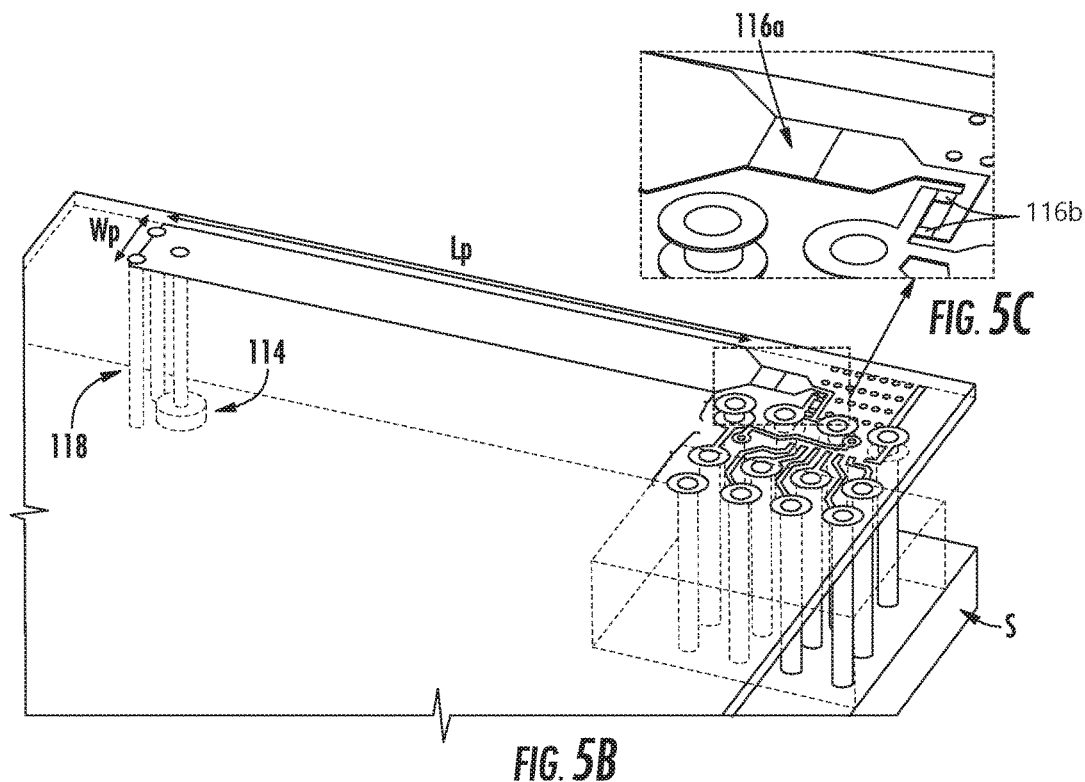
FIG. 5B
FIG. 5C
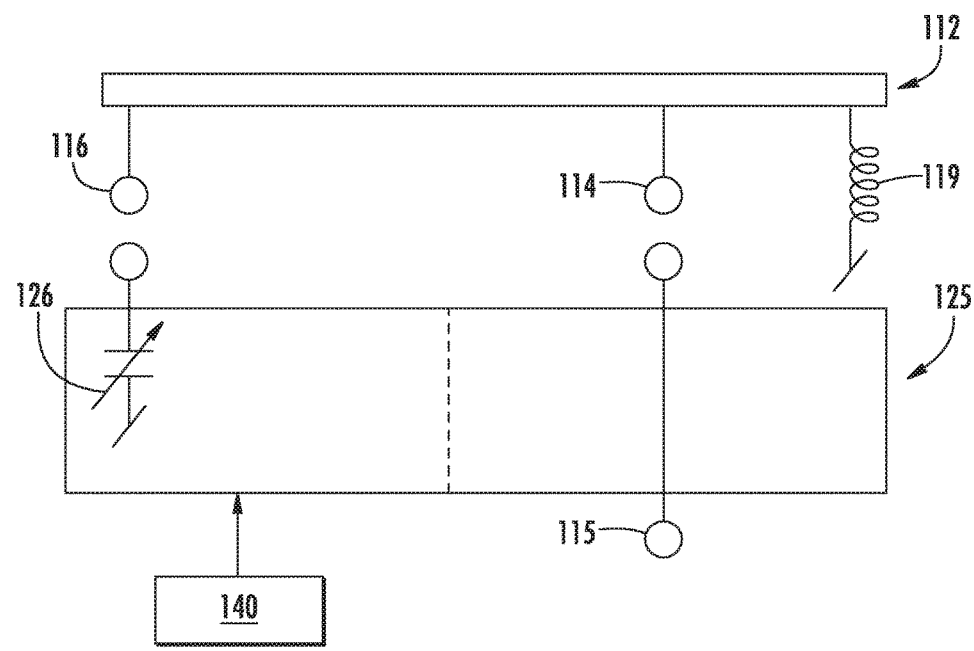
FIG. 5D

US 9,799,952 B2

FILTERING ANTENNA SYSTEMS, DEVICES, AND METHODS

PRIORITY CLAIM

The present application claims the benefit of U.S. Provisional Patent Application Ser. No. 61/842,206, filed Jul. 2, 2013, the disclosure of which is incorporated herein by reference in its entirety.

TECHNICAL FIELD

The subject matter disclosed herein relates generally to antenna elements for radio frequency systems. More particularly, the subject matter disclosed herein relates to antenna systems that are tunable within a range of frequencies.

BACKGROUND

In modern handheld devices for cellular communication systems (e.g. 3GPP) there is a desire to support multiple frequency bands (e.g 3GPP LTE bands 1, 2, 3, 5, 7, 8, and 13). Further in this regard, one particular area of interest in radio communication has been how to deal with transmitter and receiver duplexing, with transmitter and receiver operating at a fixed or variable frequency separation. For such frequency division duplex, an issue known as duplex self-interference can present a problem in the design of such systems. The problem arises from the high power of the transmitter challenging the linearity of the receiver that can be set up to have a high gain to deal with low power reception levels.

For small handheld devices, duplex operation has typically been achieved using fixed frequency filters or duplex filters (e.g., dielectric coaxial resonator filters, SAW, BAW, FBAR) that are switched among operating frequencies (e.g., for multiband operation) using semiconductor switches due to technology and size constraints. These fixed frequency filters and antennas exhibit particular limitations in that, for each band of operation, a new set of hardware must be introduced (e.g., adding antenna resonator coupling element, filters, and switches when adding band support). As a result, tunable systems would be beneficial in reducing the amount of hardware required to operate at a range of frequencies, but it is difficult to make a tunable system also cost effective and small, while at the same time meeting system requirements (e.g., 3GPP standards). In addition, the location of filters in present days phones also presents a limitation in that filters have had a design constraint on component height of less than 1 mm so it could be placed together with RF transceiver IC, digital processing IC, and multimedia processing IC.

Accordingly, it would be desirable for there to be a solution to bring down the size of a tunable solution, to make it cost efficient, and at the same time, with proper design, to solve the issue of removing unwanted interference, such as from a transmitter in the wireless communication terminal. In addition, it would further be desirable for a combined solution that makes it acceptable to place the filter in a location on the phone board that allows higher building height, and therefore allows higher diameter inductors to increase inductor Q and thereby make tunable frequency filter characteristics acceptable to system requirements.

SUMMARY

In accordance with this disclosure, devices, systems, and methods for antenna systems that are tunable within a range of frequencies for use in radio frequency systems. In one aspect, a filtering antenna device is provided. The filtering antenna device can comprise a tunable antenna having one or more first variable impedance element is configured to selectively vary an impedance at a signal path output and a tunable filter is in communication between the signal path output of the tunable antenna and a signal processing chain. The tunable filter can have one or more second variable impedance element configured to provide a frequency-selective filtering response between the signal path output and the signal processing chain. A controller in communication with both the tunable antenna and the tunable filter can be configured for selectively tuning an impedance value of one or more of the one or more first variable impedance element or the one or more second variable impedance element.

In another aspect, a filtering antenna device can comprise an antenna impedance tuner having one or more first variable impedance element configured to selectively vary an impedance at a signal path output and a tunable filter in communication between the signal path output of the antenna impedance tuner and a signal processing chain. The tunable filter can have one or more second variable impedance element configured to provide a frequency-selective filtering response between the signal path output and the signal processing chain. The antenna impedance tuner and the tunable filter are integrated together on a common module carrier.

In yet another aspect, a method for making a filtering antenna device is provided. The method can comprise integrating an antenna impedance tuner and a tunable filter on a common module carrier, the antenna impedance tuner having one or more first variable impedance element configured to selectively vary an impedance at a signal path output, and the tunable filter in communication between the signal path output of the tunable antenna and an output port configured for connection to a signal processing chain, the tunable filter having one or more second variable impedance element configured to provide a frequency-selective filtering response between the signal path output and the output port. The signal path output of each of the individual modules can be connected with an antenna element.

Although some of the aspects of the subject matter disclosed herein have been stated hereinabove, and which are achieved in whole or in part by the presently disclosed subject matter, other aspects will become evident as the description proceeds when taken in connection with the accompanying drawings as best described hereinbelow.

BRIEF DESCRIPTION OF THE DRAWINGS

The features and advantages of the present subject matter will be more readily understood from the following detailed description which should be read in conjunction with the accompanying drawings that are given merely by way of explanatory and non-limiting example, and in which:

FIGS. 5B and 5C are perspective views of a tunable antenna element of a filtering antenna device according to an embodiment of the presently disclosed subject matter;

FIG. 5D is a schematic diagram of components of a tunable antenna element of a filtering antenna device according to an embodiment of the presently disclosed subject matter;

DETAILED DESCRIPTION

The present subject matter provides devices, systems, and methods for antenna systems that are tunable within a range of frequencies for use in radio frequency systems. For example, signal transmitted by the disclosed devices, systems, and methods can comprise a modulated signal normally according to a wireless standard in accordance with a standardization body (e.g 3GPP). In this way, the devices, systems, and methods disclosed herein can be configured to communicate with a basestation (e.g., cellular basestation). As used herein, the term "Basestation" should be understood to describe any transponding unit using a fixed (i.e., a base) location antenna to serve one or more users or devices within an area. For instance 3GPP BTS, NB, and eNB will all be base stations according to this terminology. More specific BTS, NB, and eNB will all be cellular base stations.

One principle of the presently-disclosed subject matter is to combine tunable antenna components with tunable filters in one unit or in one co-located position located in proximity of the antenna/coupling elements. Such combinations can have variable impedance terminals to provide an antenna signal path with variable load impedance to one or more antenna signal terminals and/or a variable impedance load to one or more impedance load terminals of the antenna. The antenna signal can further be connected to a signal path leading into a filter circuit having one or more input connections and output connections and the capability of tuning the signal path frequency response between the inputs and outputs.

Figure 1:
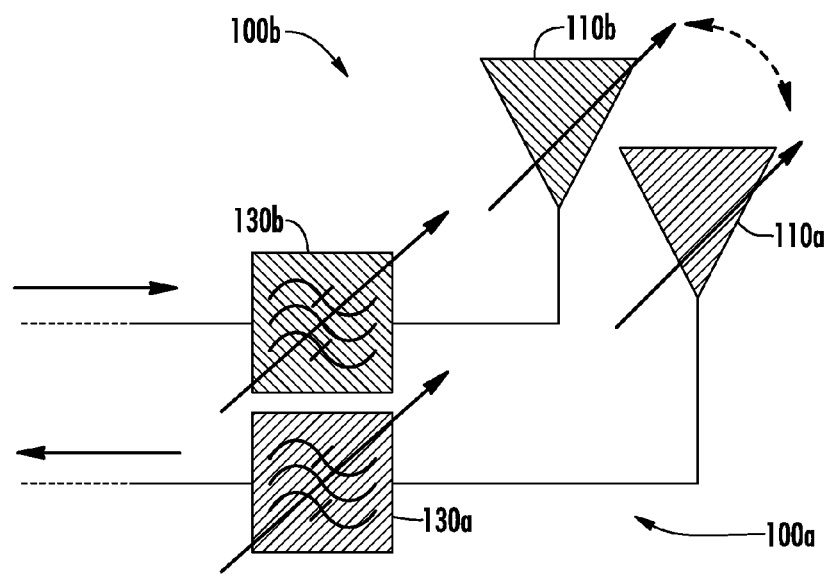
FIG. 1 is a block diagram of a system of filtering antenna devices according to an embodiment of the presently disclosed subject matter.

In one implementation of this subject matter shown in FIG. 1, for example, an antenna duplex system is shown comprising two filtering antenna devices. A first filtering antenna device 100a can comprise a first tunable antenna 110a and a first tunable filter 130a in communication between the signal path output of first tunable antenna 110a and a receive signal processing chain. Similarly, a second filtering antenna device 100b can comprise a second tunable antenna 110b and a second tunable filter 130b in communication between the signal path output of second tunable antenna 110b and a transmit signal processing chain. In this configuration, antenna tuning and front-end filtering can be provided within one unit.

Figure 2:
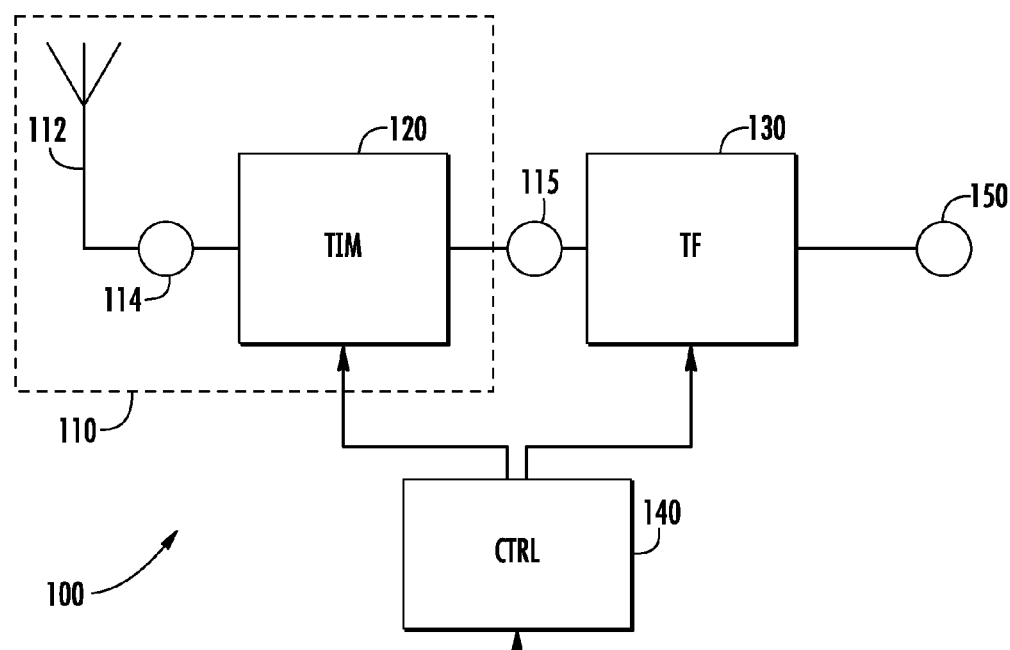
FIG. 2 is a block diagram of a filtering antenna device according to an embodiment of the presently disclosed subject matter.

In one particular configuration shown in FIG. 2, for example, a filtering antenna device, generally designated 100, can again comprise a tunable antenna 110 and a tunable filter 130 in communication between a signal path output 115 of tunable antenna 110 and a signal processing chain 150. Tunable antenna 110 can have one or more first variable impedance element configured to selectively vary an impedance at signal path output 115, and tunable filter 130 can similarly have one or more second variable impedance element configured to provide a frequency-selective filtering response between signal path output 115 and signal processing chain 150. As indicated above, signal processing chain 150 is the input to the signal path to a unit that either further process the receive signal or the output to the signal path that process the transmission signal. In addition, a controller 140 can be provided in communication with both of tunable antenna 110 and tunable filter 130. Controller 140 can be configured for selectively tuning an impedance value of one or more of the one or more first variable impedance element or the one or more second variable impedance element. For example, controller 140 can interface with tunable antenna 110 and tunable filter 130 by way of a serial control interface with a serial latch register (e.g., SPI or RFFE), and a decoding and connection circuit of controller 140 can be configured for reading latch register information and applying this information to change the impedance of the tuning elements of tunable antenna 110 and tunable filter 130.

Regardless of the particular form and connection of controller 140, changing the impedance of the tuning elements of tunable antenna 110 and tunable filter 130 can comprise applying a pseudo static electric or magnetic field. In such an arrangement, the tuning elements can comprise one or more capacitive element (e.g., a MEMS capacitor, semiconductor-switched capacitor, varactor, BST, or a variable capacitor produced using semiconductor technology like CMOS, SOI (Silicon On Insulator), or pseudomorphic high-electron-mobility transistor (pHEMT)). Depending on the particular technology used to implement such variable capacitance, tuning can be achieved using electro mechanical actuation (e.g., MEMS), electric field actuation (e.g., pin diodes or tunable dielectrics like BST), or electrical semiconductor switches connected to an array of capacitances. For electrical semiconductor switches, tuning can be based on voltage field switching (e.g., pHEMT, JFET, CMOS) or current switching (e.g., Bipolar transistors like GaAs HBT). Such variable capacitance can be programmable either using serial bus (SPI, RFFE, I2C, etc.) or programmable registers that through semiconductor devices (transistors, gates, ADC's etc.) control the capacitance value of the variable capacitor. In some embodiments, the tuning elements can further comprise one or more inductor, the one or more inductor being characterized by its ability to store magnetic field energy by having a (varying) current running between its conductive nodes.

Regarding the general configuration of tunable antenna 110, an antenna element 112 can be configured to provide electromagnetic coupling of transmission or receive signals towards a remote wireless communication unit, either through direct coupling (e.g., self-radiating antenna) or through coupling to another metallic surface (e.g., terminal ground chassis). In addition, antenna element 112 can be coupled to an antenna impedance tuner characterized by having one or more connection points towards antenna element 112 for which the impedance can be varied according to input from controller 140.

In the embodiment shown in FIG. 2, for example, the antenna impedance tuner can comprise a tunable impedance matching network 120 that is provided in communication between a signal path connection point 114 of antenna element 112 and signal path output 115 to which tunable filter 130 is connected. In this configuration, tunable impedance matching network can be configured to match the impedance level between signal path connection point 114 of antenna element 112 and signal path output 115 of tunable antenna 110.

Figure 3A:
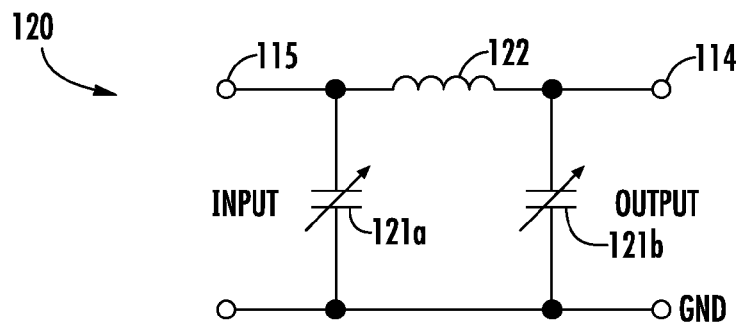
FIGS. 3A through 3C are schematic diagrams of equivalent circuit arrangements for tunable impedance matching networks for use with a filtering antenna device according to embodiments of the presently disclosed subject matter.
Figure 3B:
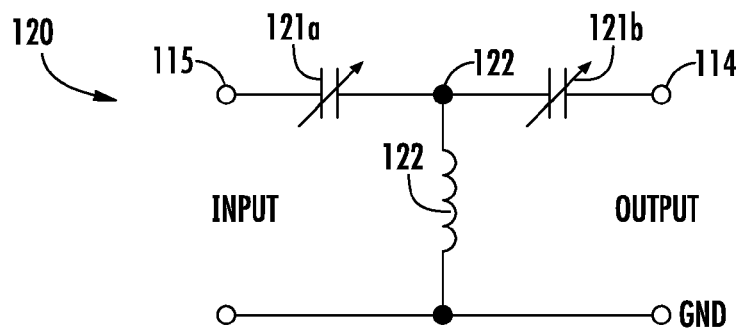

To achieve this matching, any of a variety of configurations for tunable impedance matching network 120 can be used. As shown in FIG. 3A, for example, tunable impedance matching network 120 can comprise a "Pi"-network in which a first tunable impedance match capacitor 121a is connected between signal path output 115 and a ground, a second tunable impedance match capacitor 121b is connected between signal path connection point 114 and ground, and an impedance match inductor is connected between signal path output 115 and signal path connection point 114. Alternatively, as shown in FIG. 3B, tunable impedance matching network 120 can comprise a "Tee"-network in which first variable impedance match capacitor 121a and second variable impedance match capacitor 121b are connected in a series arrangement between signal path output 115 and signal path connection point 114, and impedance match inductor 122 is connected at one terminal to a node between first and second variable impedance match capacitors 121a and 121b and at another terminal to ground.

Figure 3C:
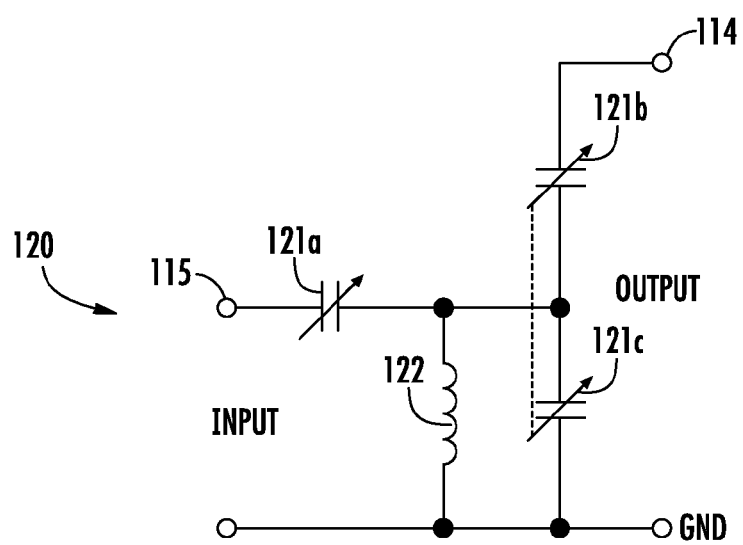

In yet a further alternative configuration shown in FIG. 3C, tunable impedance matching network 120 can comprise a series-parallel capacitor match in which first variable impedance match capacitor 121a and second variable impedance match capacitor 121b are again connected in a series arrangement between signal path output 115 and signal path connection point 114, and impedance match inductor 122 is connected at one terminal to a node between first and second variable impedance match capacitors 121a and 121b and at another terminal to ground. In addition, however, this configuration can further include a third variable impedance match capacitor 121c connected in parallel with impedance match inductor 122 between the node between first and second variable impedance match capacitors 121a and 121b and ground. Of course, those having skill in the art will recognize that the arrangement of tunable impedance matching network 120 need not be limited to these exemplary configurations. Rather, any arrangement can be used in which the impedance level between signal path connection point 114 of antenna element 112 can be matched to that at signal path output 115.

Figure 4:
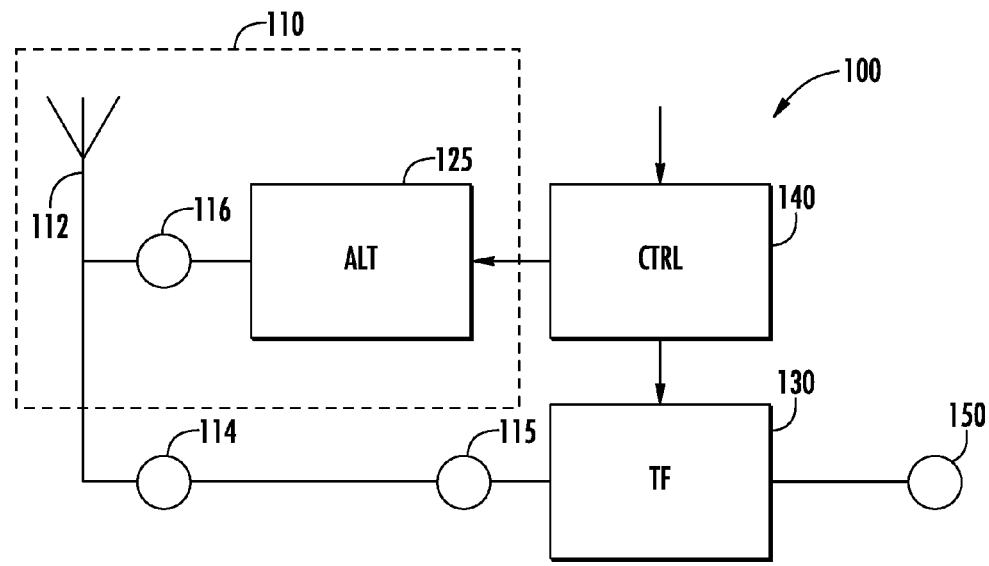
FIG. 4 is a block diagram of a filtering antenna device according to an embodiment of the presently disclosed subject matter.

In an alternative configuration shown in FIG. 4, the antenna impedance tuner of tunable antenna 110 can comprise an antenna load tuner 125 instead of or in addition to tunable impedance matching network 120. In such a configuration, antenna load tuner 125 can have variable impedance outputs loading one or more load tuning connections 116 of antenna element 110. An antenna impedance tuner arranged in this way can normally have fixed impedances between signal path connection point 114 of antenna element 112 and signal path output 115. In yet a further alternative, however, the antenna impedance tuner can comprise a combination of tunable impedance matching network 120 and antenna load tuner 125 for tuning both resonance(s) of antenna element 112 and impedance levels (i.e., coupling to antenna element 112).

Figure 5A:
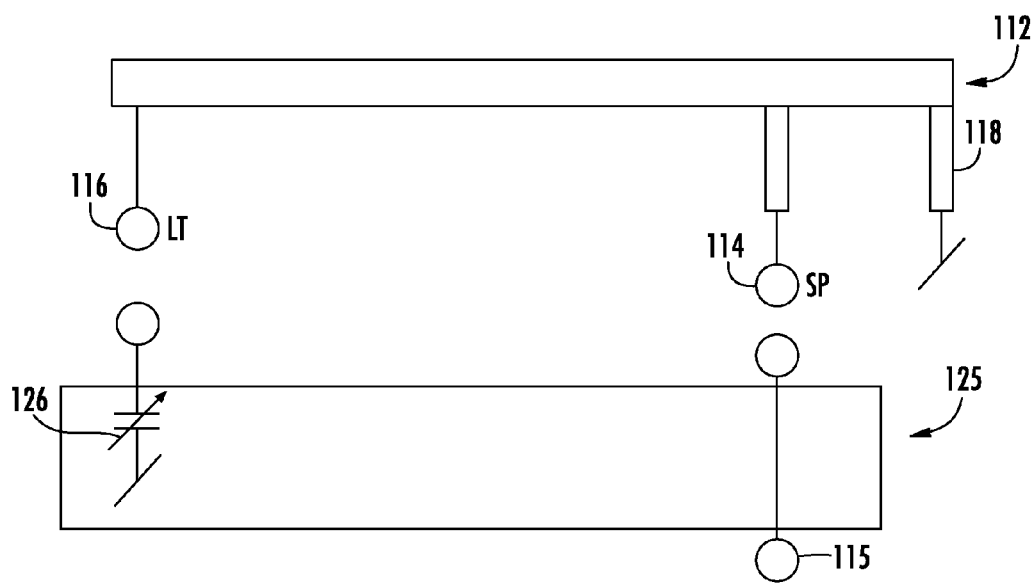
FIG. 5A is a schematic diagram of components of a tunable antenna of a filtering antenna device according to an embodiment of the presently disclosed subject matter.

Regarding the particular configuration and operation of antenna load tuner 125, FIG. 5A illustrates one exemplary arrangement. In this embodiment, antenna element 112 has both signal path connection point 114 and load tuning connections 116. Specifically, load tuning connections 116 can be provided at one end of antenna element 112, whereas signal path connection point 114 and a shorting pin 118 can be connected to an opposing end of antenna element 112. As discussed above, antenna load tuner 125 can be connected in communication with the one or more load tuning connections 116. In the configuration shown in FIG. 5A, antenna load tuner 125 can comprise a variable load tuning capacitor 126, although those having skill in the art will recognize that other arrangements can be used for tuning the resonance(s) of antenna element 112. For example, FIGS. 5B and 5C illustrate one particular arrangement for antenna element 112 in which a first load tuning connection 116a can be provided for connection to a series surface-mount device (SMD) capacitor, and a plurality of second load tuning connections 116b can be provided for connection to tunable capacitors (e.g., variable load tuning capacitor 126). Again, the opposing end of antenna element 112 can be connected to signal path connection point 114 and shorting pin 118. Alternatively, as shown in FIG. 5D, shorting pin 118 can be replaced by a fixed inductive load 119.

Figure 7:
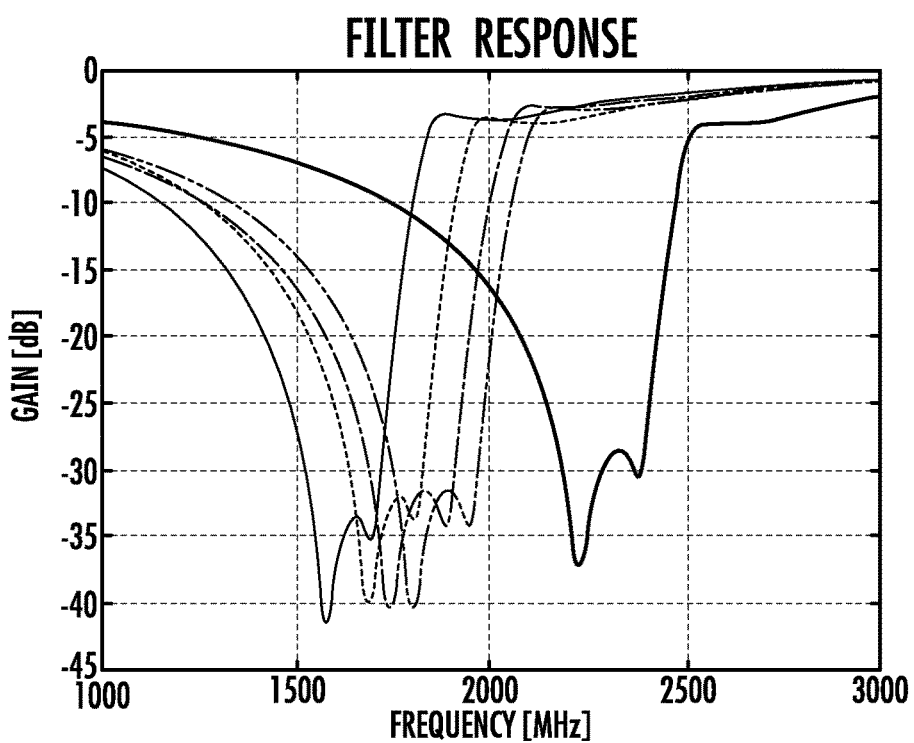
FIG. 7 is a graph illustrating examples of varying a filter transfer function of a filtering antenna device according to embodiments of the presently disclosed subject matter.

Regardless of the particular configuration for tunable antenna 110, tunable filter 130 can provide a frequency-selective filtering response between its input and output terminals according to the setting of controller 140. For example, tunable filter 130 can be configured to provide tunable band reject characteristics capable of rejecting an interfering signal. This mode of operation can be useful for a frequency-domain duplexing (FDD) system having simultaneous transmit and receive signals, so to reject the transmit frequency in a receive implementation of present invention. Alternatively, for example, it can be used to reject noise in a receive band in a transmitter implementation of the present subject matter. In other embodiments, tunable filter 130 can be configured to provide tunable band pass characteristics having bandwidth at least as large as a modulating bandwidth of a desired signal to be passed. In this way, tunable filter 130 can be configured to move the pass band of a selective bandpass filter, and/or it can be configured to optimize the signal pass band characteristics of the tunable band reject configuration discussed above by moving a zero of the transfer function (See, e.g., FIG. 7). In further embodiments, tunable filter 130 can be configured to provide tunable low-pass characteristics (e.g., to reject harmonics in either receive or transmit branch), tunable high-pass characteristics, or a combination of any of these characteristics as desired.

Figure 6A:
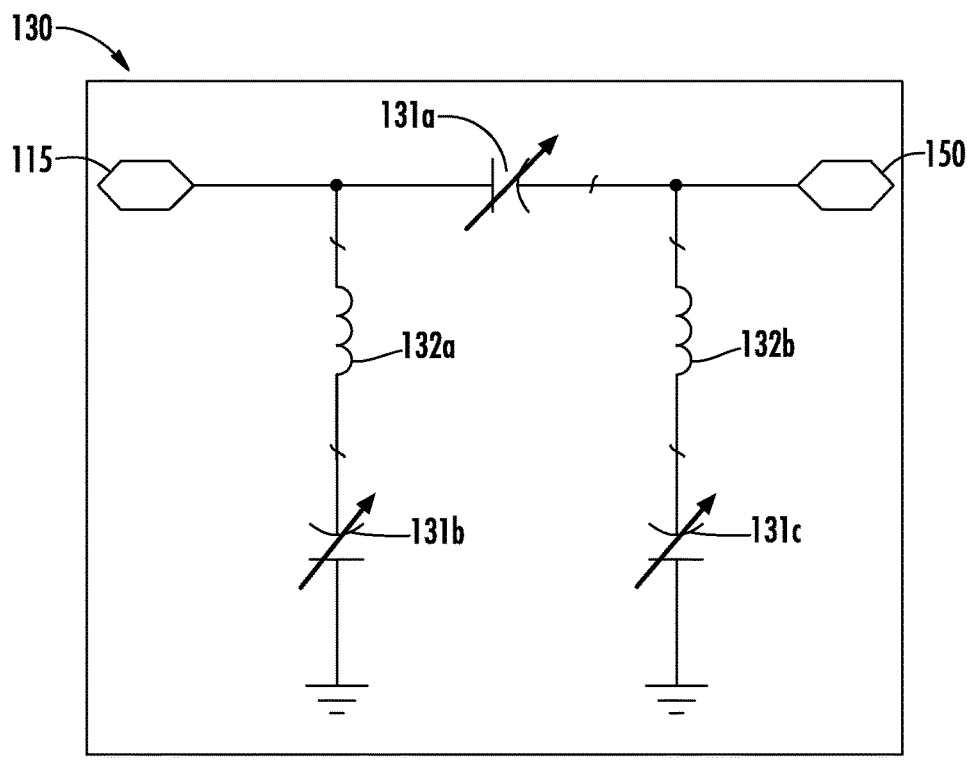
FIGS. 6A through 6C are schematic diagrams of equivalent circuit arrangements for tunable filters for use with filtering antenna devices according to embodiments of the presently disclosed subject matter.
Figure 6B:
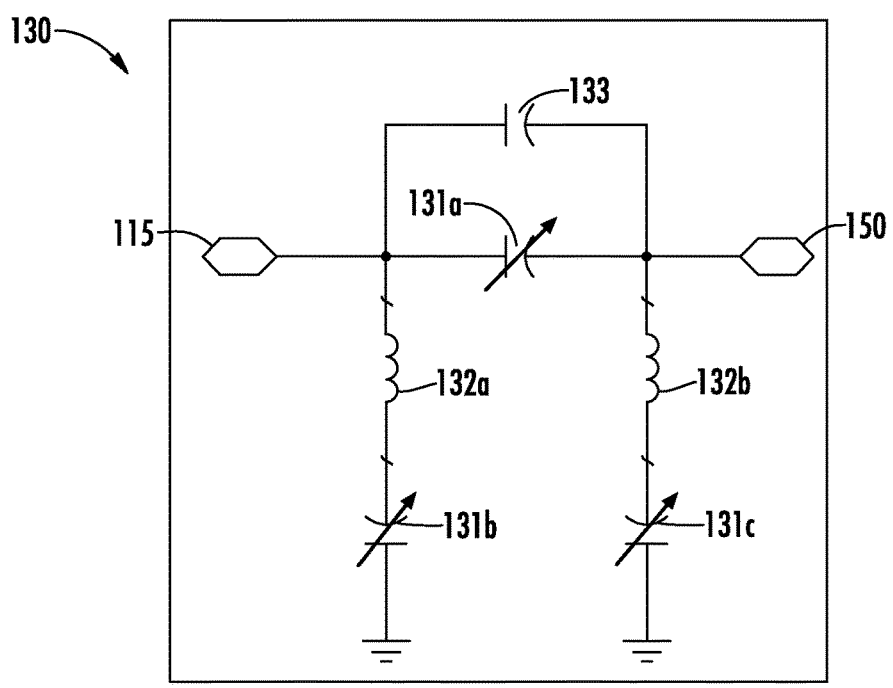
Figure 6C:
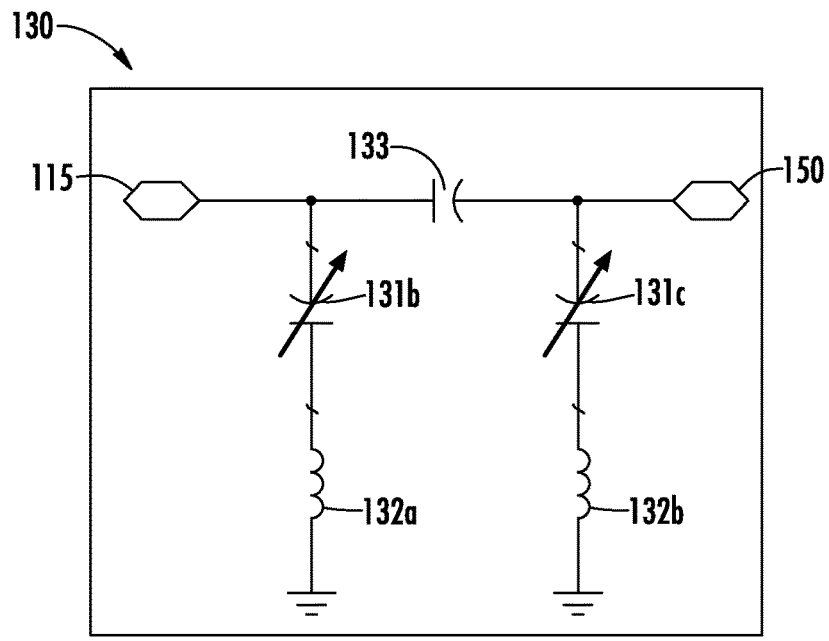

To achieve these functional modes, any of a variety of element configurations can be used for tunable filter 130. For example, FIGS. 6A through 6C illustrate various circuit arrangements that can be used. Specifically, FIG. 6A illustrates an arrangement in which a first tunable filter capacitor 131a is coupled in series between signal path output 115 and signal processing chain 150, a second tunable filter capacitor 131b and a first filter inductor 132a are connected in a series arrangement between signal path output 115 and a ground, and a third tunable filter capacitor 131c and a second filter inductor 132b are connected in a series arrangement between signal processing chain 150 and a ground. As shown in FIG. 6B, a similar arrangement can be configured to further include a fixed filter capacitor 133 connected in parallel with first tunable filter capacitor 131a between signal path output 115 and signal processing chain 150. Alternatively, as illustrated in FIG. 6C, an arrangement for tunable filter 130 can include only a fixed filter capacitor 133 coupled in series between signal path output 115 and signal processing chain 150, a second tunable filter capacitor 131b and a first filter inductor 132a are connected in a series arrangement between signal path output 115 and a ground, and a third tunable filter capacitor 131c and a second filter inductor 132b are connected in a series arrangement between signal processing chain 150 and a ground.

Figure 8A:
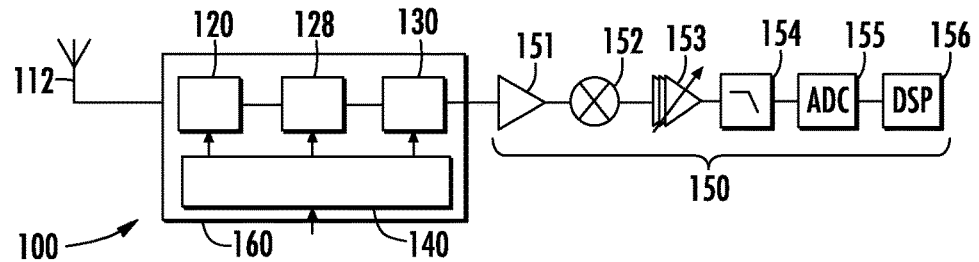
FIGS. 8A through 8D are block diagrams of various configurations of filtering antenna devices according to embodiments of the presently disclosed subject matter.
Figure 8B:
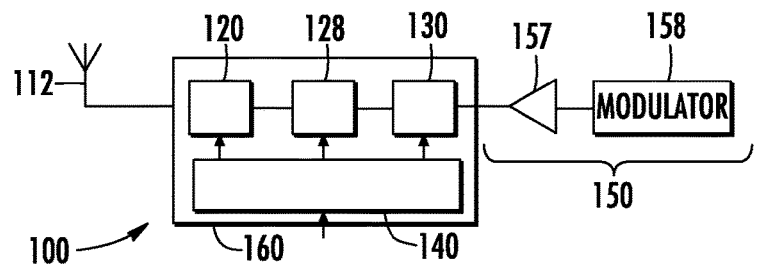
Figure 8C:
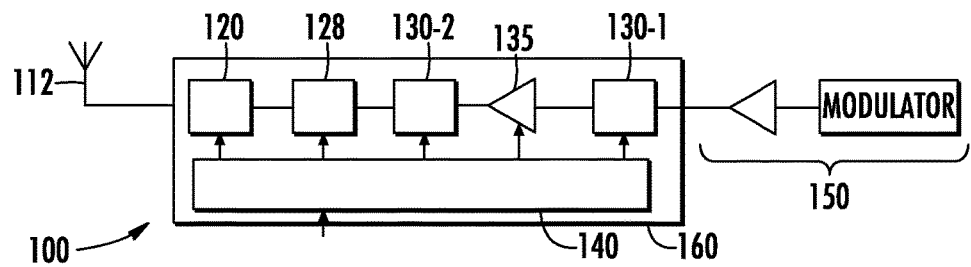
Figure 8D:
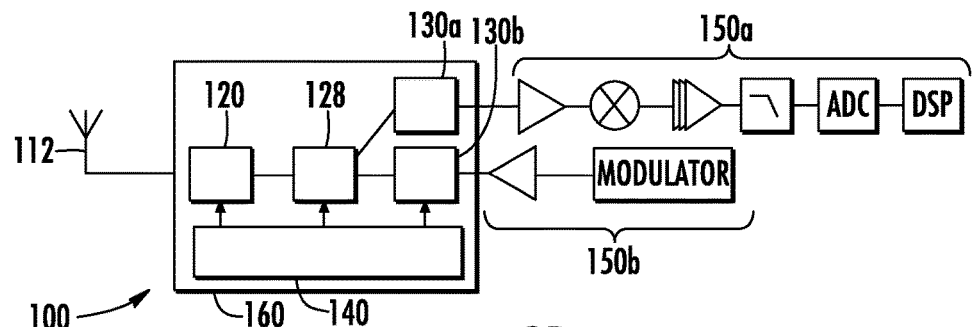
Figure 9A:
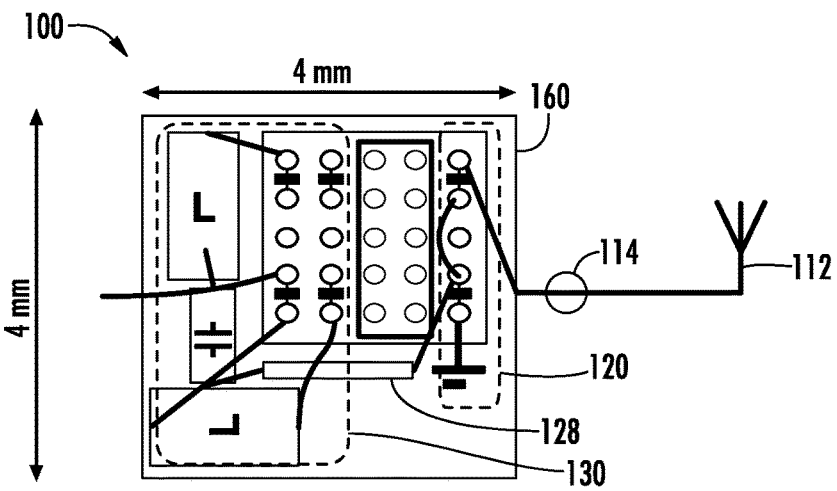
FIGS. 9A through 9H are plan view of components of a filtering antenna integrated on a module carrier according to embodiments of the presently disclosed subject matter.
Figure 9B:
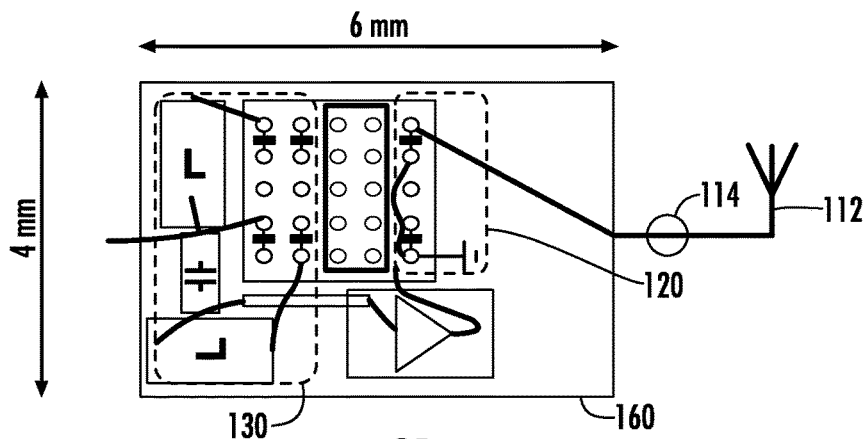
Figure 9C:
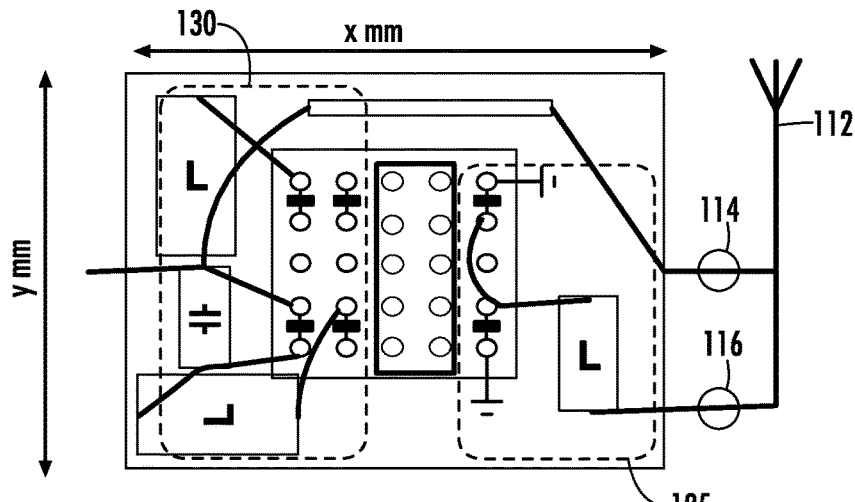
Figure 9D:
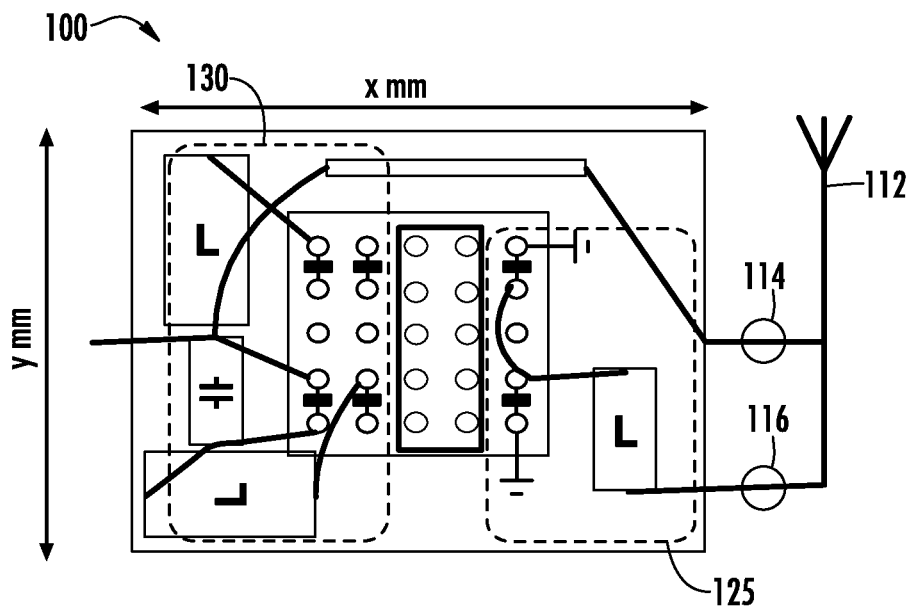
Figure 9E:
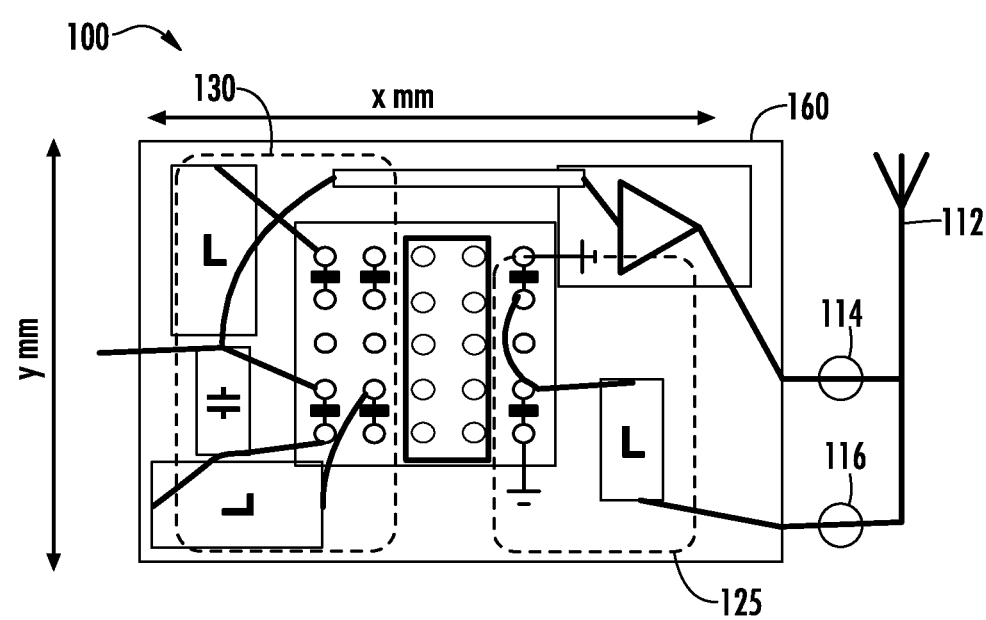
Figure 9F:
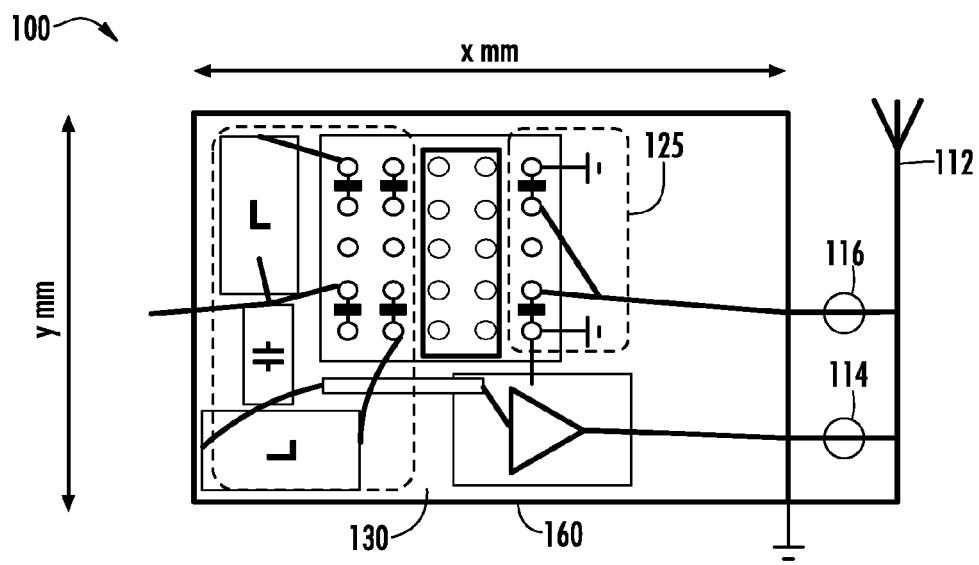
Figure 9G:
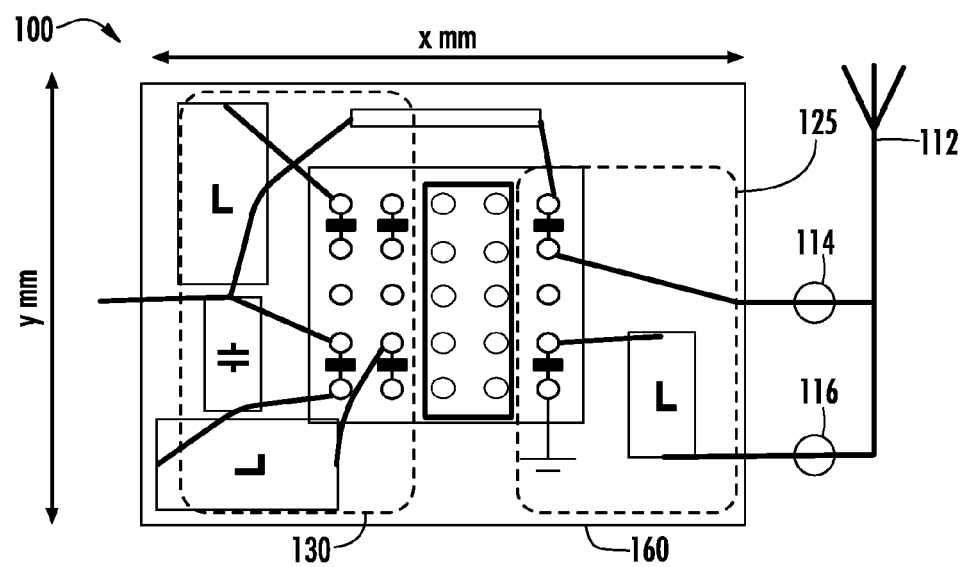
Figure 9H:
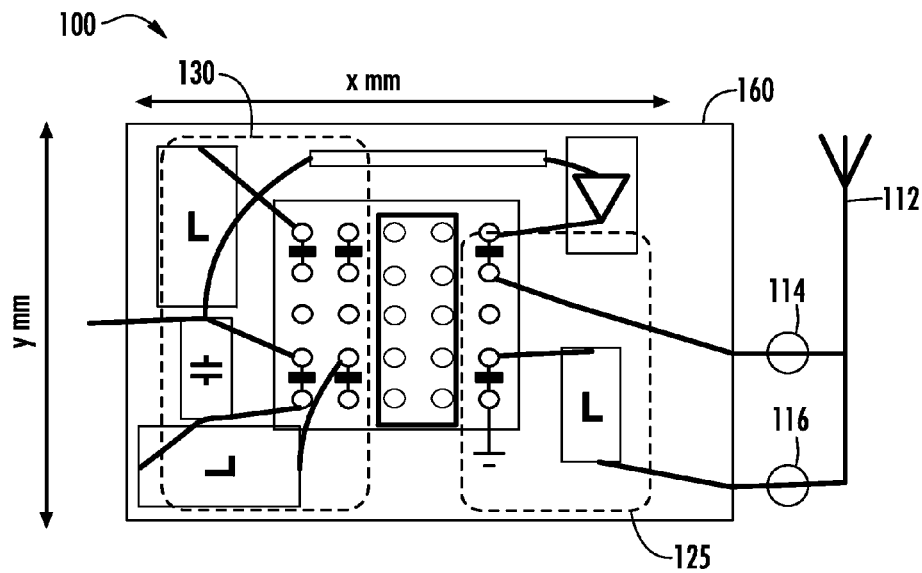

Referring to FIGS. 8A through 8D, filtering antenna device 100 can be implemented in a variety of system configurations. First, for example, FIG. 8A illustrates a configuration in which filtering antenna device 100 is coupled to a receive signal chain. In such a configuration, signal processing chain 150 can normally comprise a low-noise amplifier (LNA) 151, a frequency-selection down conversion mixer 152, a variable-gain amplifier (VGA) 153, a system of signal selection filtering 154, an analog-to-digital converter (ADC) system 155, and a digital processing system 156 (e.g., DSP). Alternatively, as illustrated in FIG. 8B, filtering antenna device 100 can be coupled to a transmit signal chain. In this configuration, filtering antenna device 100 can be connected to a configuration of signal processing chain 150 that can normally comprise a pre-drive amplifier 157 and a modulator 158, which can itself comprise a voltage-controlled oscillator (VCO), a phase-locked loop (PLL), one or more mixers, and digital processing logic. FIG. 8C illustrates a variation on a transmit-side implementation of filtering antenna device 100 in which two filtering stages 130-1 and 130-2 can be used. In yet a further alternative configuration shown in FIG. 8D, filtering antenna device can be adapted for use in a tunable duplex transceiver signal chain. In this configuration, filtering antenna device 100 can comprise both a first tunable filter 130a connected to a receive signal processing chain 150a and a second tunable filter 130b connected to a transmit signal processing chain 150b.

In any arrangement, filtering antenna device 100 can be configured for operation in a wireless terminal system that responds, based on UE downlink protocol stack information, to commands given by a wireless basestation controller (e.g., 3GPP). Specifically, filtering antenna device 100 can be configured to set up the frequency response of such circuit or subcircuit of signal processing chain 150 according to the band assigned for receive or transmit. Alternatively, filtering antenna device 100 can be configured to set up the frequency response of such circuit or subcircuit of signal processing chain 150 according to the physical frequency channel assigned for receive or transmit. In this configuration, in systems in which the wireless terminal system has no downlink protocol link or broad cast information decoded, and so going into a process of establishing a scan of power over frequency, the frequency response of such circuit or sub-circuit can be set up according to the channel or frequency or frequency band being scanned for power (e.g., searching for high power broadcast channels). This information about channel or frequency can be taken either from the layered UE protocol stack (e.g., 3GPP channel numbers) or from somewhere in the processing chain that performs translation of channel number to PLL setting. In this way, the frequency response of such a circuit or subcircuit can be set up according to the physical frequency channel assigned for receive or transmit.

In addition to changing the form of signal processing chain 150, the form and function of filtering antenna device 100 can further be modified by incorporating one or more signal transfer block 128 between the antenna impedance tuner (e.g., tunable matching network 120) and tunable filter 130. For example, signal transfer block 128 can comprise one or more of a fixed frequency filter (e.g., for harmonic low pass filtering), an amplifier amplifying levels between input and outputs (e.g., for a TX path where it would be preferable to have the loss from the tunable filter prior to the last stage(s) of the power amplifier, so the amplifier couples directly into the antenna, thereby minimizing loss), an electromagnetic coupling path (e.g., inductive or capacitive) that allows tunable antenna 110 and tunable filter 130 to not have to be conductively connected, a circuit for maximizing signal bandwidth (e.g., to make the combined response have Chebycheff multiresonant characteristics), and/or a conductive connection between inputs and outputs (e.g., short or transmission line type). In addition, combinations of these elements can be used to achieve further control over the signal response of filtering antenna device 100. For instance, providing both an amplifier and a harmonic filter between the antenna impedance tuner and tunable filter 130 can enable filtering antenna device 100 to reject the harmonics created by the power amplifier. Furthermore, in such a system, the harmonic filter can even be tunable so as to increase the bandwidth supported by the transmitter.

Regardless of the particular implementation of filtering antenna device 100, one possible advantage of combining the tunable antenna components with tunable filters in one unit and/or in one co-located position can be to provide greater freedom to control the elements to achieve the desired frequency response and to optimize the coupling or transfer path from tunable antenna 110 to tunable filter 130, therefore making it possible to optimize for low insertion loss, higher bandwidth, or by other means optimizing the combined frequency response of filtering antenna device. To further enable such advantages, all of the tuning elements of filtering antenna device 100 can be provided together on one module. As shown in FIGS. 8A through 8D, each of tunable impedance matching network 120 (or antenna load tuner 125), tunable filter 130, and controller 140 can be integrated together in a single module 160. Further in this regard, it can be additionally advantageous for all of the tuning elements to be controlled at the same address (i.e., all tuners on one chip). Referring to FIGS. 9A through 9H, for example, filtering antenna device 100 can be provided in a variety of configurations, with all tuning components and connection paths on a single small (e.g., 4 mm×4 mm) module carrier 160. In this way, the elements of tunable antenna 110 and tunable filter 130 can share a common capacitor array and control silicon.

Specifically, for example, module 160 can be formed from a common carrier from which components of multiple modules are integrated or mounted and interconnected. Such a common carrier can comprise a wafer as used for planar circuit semiconductors (e.g., a silicon wafer), a wafer as used for processing MEMS devices, or a "strip" manufactured using package laminate processing or printed circuit board (PCB) technology or build up board processing (e.g., commonly used for packaging and modules). Using such a process, the modules can be isolated by dividing the common carrier (e.g., using saw or CNC routing) into individual modules. Prior to the isolation, the modules can be overmolded or otherwise enclosed to either shield or create a regular top surface.

Figure 10:
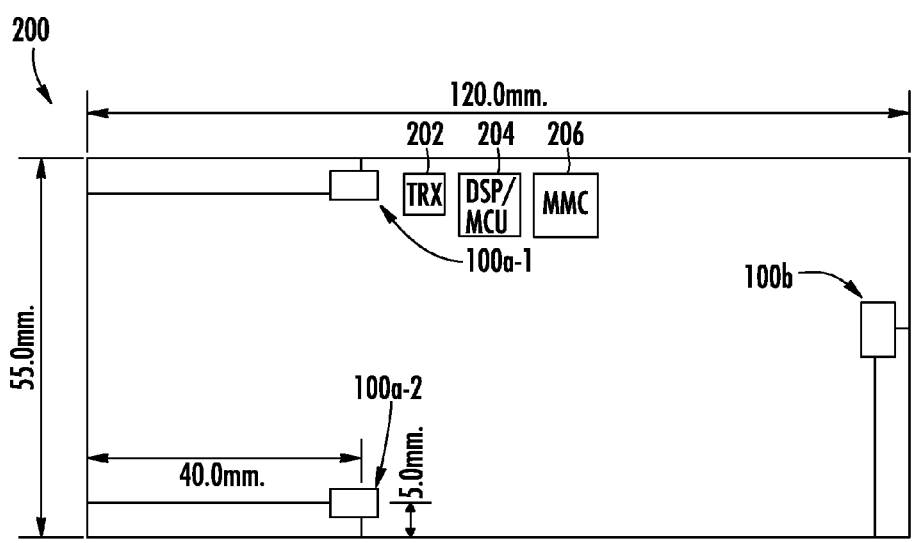
FIG. 10 is a plan view of elements of a smartphone including filtering antenna devices according to an embodiment of the presently disclosed subject matter.
Figure 11A:
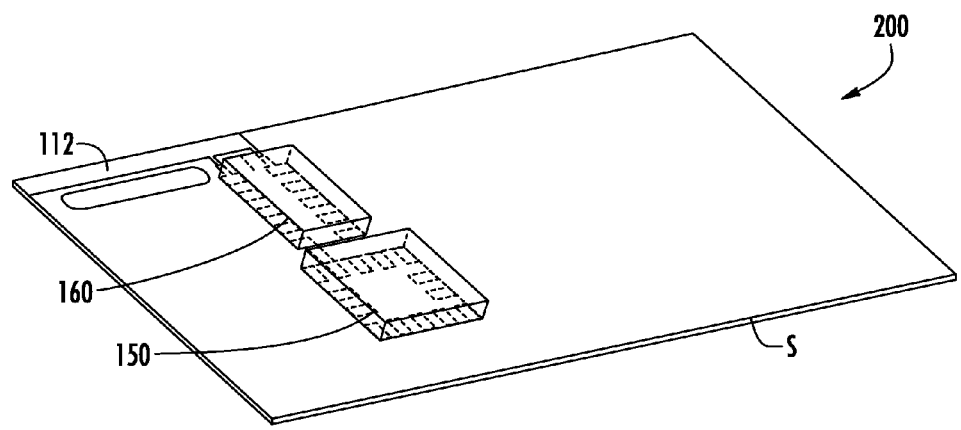
FIGS. 11A and 11B are perspective views of elements of a smartphone including filtering antenna devices according to embodiments of the presently disclosed subject matter.
Figure 11B:
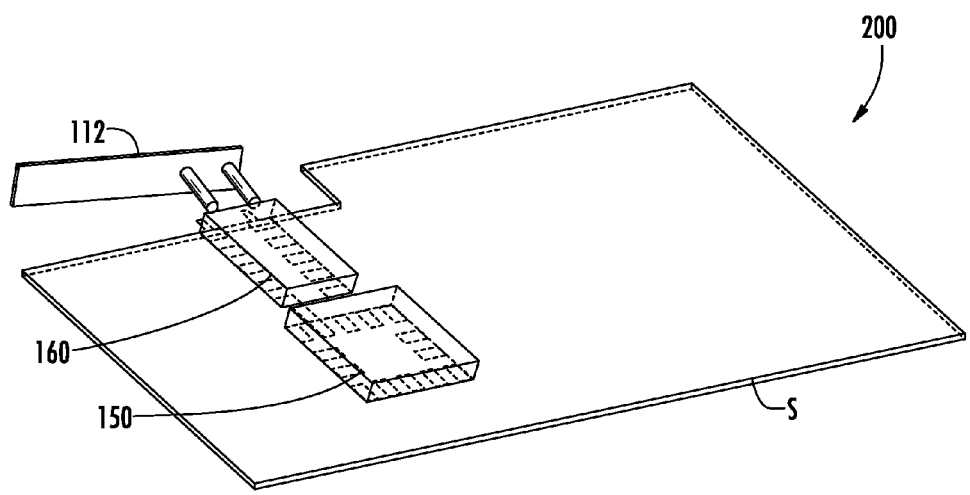

In addition, when implemented in a wireless phone, a further advantage that can be achieved by the integration and/or co-location of the tuning elements of filtering antenna device 100 is that these elements can be located in a region of a phone board where higher building height may be allowed. In many phone designs, bulk is to be minimized to the greatest extent possible, and thus with much of the thickness of the device being devoted to a display screen and battery, conventional design rules limit the thickness of elements within the primary footprint of the device to be less than 1 mm. The device's antenna elements, however, are generally outside of the region occupied by the battery and/or display. As a result, filtering antenna device 100 can be located in this antenna space of a wireless device, generally designated 200, and thus component building heights greater than 1 mm can be achieved. For example, referring to FIG. 10, a first receive filtering antenna device 100a-1, a second receive filtering antenna device 100a-2, and a transmit filtering antenna device 100b can all be implemented within a close proximity to a respective one of the device's antennas, whereas an associated RF transceiver (TRX) 202, digital signal processor/micro controller unit 204, and/or a multimedia controller 206 can remain in conventional component space locations. FIGS. 11A and 11B further illustrate configurations in which a module 160 on which filtering antenna device 100 can be provided can be integrated onto a floor plan of wireless device 200, with antenna element 112 being provided in either a planar orientation (See, e.g., FIG. 11A) or a vertical orientation (See, e.g., FIG. 11B).

Figure 12:
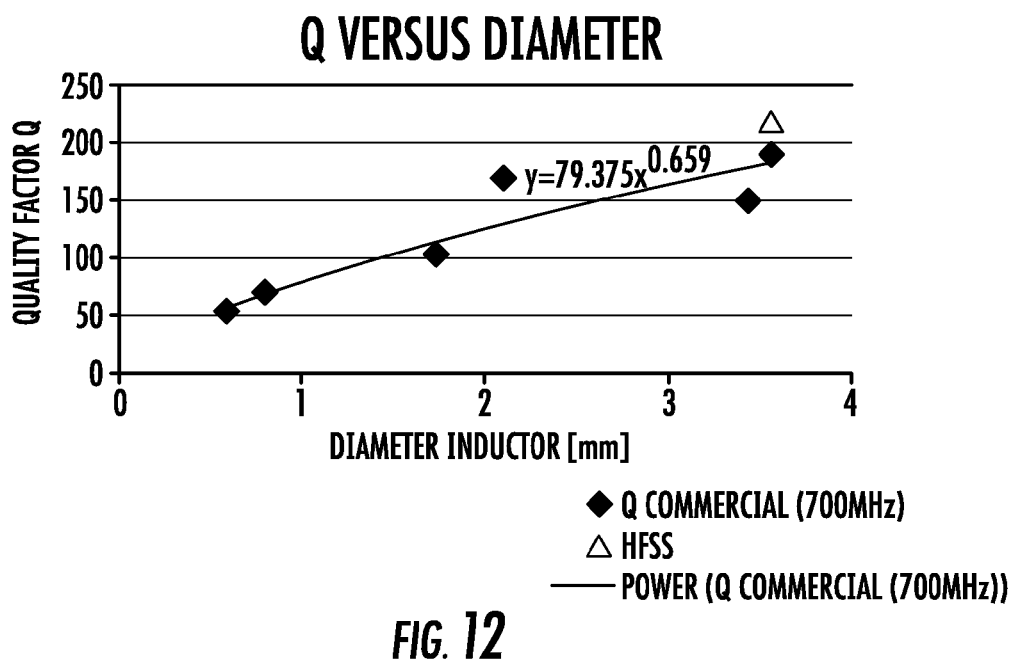
FIG. 12 is a graph illustrating the correlation between the quality factor Q and a diameter of an inductor when implemented in filtering antenna devices according to embodiments of the presently disclosed subject matter.
Figure 13:
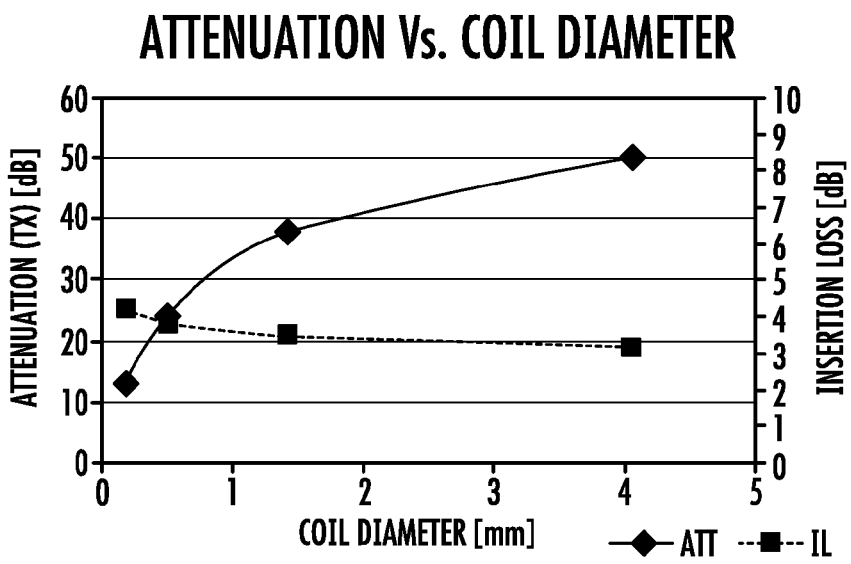
FIG. 13 is a graph illustrating the correlation between attenuation and coil diameter of an inductor when implemented in filtering antenna devices according to embodiments of the presently disclosed subject matter.

One benefit of the greater freedom of component design afforded by this increased build height is that the inductors of the tuning components of filtering antenna device 100 can be larger. Specifically, the inductors can be implemented with turns (i.e., loops) of conductive material in a way that the turns share the same magnetic field. Exemplary configurations of this arrangement can include wound helicals, wound squared helical, planar inductors, multilayer planar inductors (e.g thin/thick film inductors), or vertical inductors in planar technologies or inductors manufactured using wirebonding. In any particular implementation, the inductors can be sized to have an outer conductor turns diameter or effective conductor winding aperture (e.g., x, y) larger than 0.7 mm. Those having skill in the art will recognize that the term "effective conductor winding aperture" is used, for example, to describe the largest dimensions for inductors having non-circular windings or turns (e.g., square, rounded square or rectangular turns in two perpendicular directions both perpendicular to the magnetic field induced by the turn). Since the diameter of the inductor can be correlated to increased quality factor Q (See, e.g., FIG. 12) as well as improvements in attenuation and insertion loss (See, e.g., FIG. 13), this greater freedom of build height allows the use of higher Q inductors and therefore higher Q of the filter resonators.

In this regard, for example, a total path band loss of less than 7 dB and a reject band attenuation of more than 18 dB can be achieved at corresponding duplex frequencies. In particular, for instance, if filtering antenna device 100 is implemented as a component in a receive filter, it can have suppression at a notch or band reject frequency corresponding to the transmit band so that the filtering antenna gain in dBi is more than 10 dB lower than the filtering antenna gain in dBi at the neighboring non-notch frequencies (i.e., in the receive band). Of course, those having skill in the art will recognize that the converse is also true where filtering antenna device 100 is implemented as a component in a transmit filter.

The present subject matter can be embodied in other forms without departure from the spirit and essential characteristics thereof. The embodiments described therefore are to be considered in all respects as illustrative and not restrictive. Although the present subject matter has been described in terms of certain preferred embodiments, other embodiments that are apparent to those of ordinary skill in the art are also within the scope of the present subject matter.

What is claimed is:

1. A filtering antenna device comprising:
   a module carrier integrated onto a floor plan of a wireless device;
   a tunable antenna having one or more first variable impedance element positioned on the module carrier and configured to selectively vary an impedance at a signal path output;
   a tunable filter in communication between the signal path output of the tunable antenna and a signal processing chain, the tunable filter having one or more second variable impedance element positioned on the module carrier and configured to provide a frequency-selective filtering response between the signal path output and the signal processing chain; and
   a controller in communication with both the tunable antenna and the tunable filter;
   wherein the controller is configured for selectively tuning an impedance value of one or more of the one or more first variable impedance element or the one or more second variable impedance element.

2. The filtering antenna device of claim 1, wherein the tunable antenna comprises:
   an antenna element having a signal path connection point; and
   a tunable impedance matching network in communication between the signal path connection point and the signal path output;
   wherein the tunable impedance matching network is operable to match an antenna impedance to the impedance at the signal path output.

3. The filtering antenna device of claim 1, wherein the tunable antenna comprises:
   an antenna element having a signal path connection point and a load tuning connection; and
   an antenna load tuner in communication with the load tuning connection;
   wherein the antenna load tuner is to configured to provide variable impedance values to the antenna element to adjust a resonant frequency of the antenna element.

4. The filtering antenna device of claim 1, wherein the one or more first variable impedance element or the one or more second variable impedance element comprises one or more tunable capacitors.

5. The filtering antenna device of claim 4, wherein the one or more tunable capacitors comprise one or more of a MEMS capacitor, semiconductor-switched capacitor, varactor, BST, or a variable capacitor produced using semiconductor technology including CMOS, SOI, or pHEMT; and wherein the controller is configured to adjust the tuning state of the one or more tunable capacitors by respectively controlling one or more of electromechanical actuation, electric field actuation, or switching of electrical semiconductor switches connected to an array of capacitances.

6. The filtering antenna device of claim 1, wherein the one or more first variable impedance element or the one or more second variable impedance element comprises one or more inductor.

7. The filtering antenna device of claim 6, wherein the one or more inductor comprises a plurality of turns of conductive material;
wherein in the turns share a common magnetic field; and
wherein an effective conductor winding aperture is larger than 0.7 mm.

8. The filtering antenna device of claim 1, wherein the frequency-selective filtering response of the tunable filter comprises one or more of tunable band reject characteristics configured for rejecting an interfering signal, tunable band pass characteristics having a bandwidth of at least a modulating bandwidth of a signal to be passed, tunable lowpass characteristics, or tunable highpass characteristics.

9. The filtering antenna device of claim 1, wherein the controller is configured for selectively tuning an impedance value of the one or more of the one or more first variable impedance element or the one or more second variable impedance element based on commands given by a wireless basestation controller.

10. The filtering antenna device of claim 9, wherein the controller is configured to set up a frequency response of one or both of the tunable antenna or the tunable filter according to a band assigned for receive or transmit by the wireless basestation controller.

11. The filtering antenna device of claim 1, wherein the module carrier has a height of at least 1 mm.

12. The filtering antenna device of claim 1, wherein the control unit is positioned on the module carrier.

13. The filtering antenna device of claim 1, wherein the signal processing chain comprises one of a receive processing chain or a signal transmission path.

14. The filtering antenna device of claim 1, wherein the filtering antenna system is configured to have suppression at a notch or band reject frequency so that the filtering antenna gain in dBi is more than 10 dB lower than the filtering antenna gain in dBi at frequencies outside of the notch or band reject frequency.

15. A filtering antenna device comprising:
an antenna impedance tuner having one or more first variable impedance element configured for connection to one or more connection points of an antenna element for which the impedance can be varied; and
a tunable filter configured for connection to a signal path output of the antenna element and to a signal processing chain, the tunable filter having one or more second variable impedance element configured to provide a frequency-selective filtering response between the signal path output and the signal processing chain;
wherein the antenna impedance tuner and the tunable filter are integrated together on a common module carrier that is integrated onto a floor plan of a wireless device.

16. The filtering antenna device of claim 15, wherein the antenna impedance tuner comprises a tunable impedance matching network configured for connection between a signal path connection point of an antenna element and the signal path output;
wherein the tunable impedance matching network is operable to match an antenna impedance to the impedance at the signal path output.

17. The filtering antenna device of claim 15, wherein the antenna impedance tuner comprises an antenna load tuner configured for connection with a load tuning connection of an antenna element;
wherein the antenna load tuner is to configured to provide variable impedance values to the antenna element to adjust a resonant frequency of the antenna element.

18. The filtering antenna device of claim 15, wherein the one or more first variable impedance element or the one or more second variable impedance element comprises one or more inductor.

19. The filtering antenna device of claim 18, wherein the one or more inductor comprises a plurality of turns of conductive material;
wherein in the turns share a common magnetic field; and
wherein an effective conductor winding aperture is larger than 0.7 mm.

20. The filtering antenna device of claim 15, wherein the common module carrier has a height of at least 1 mm.

21. The filtering antenna device of claim 15, comprising a controller positioned on the common module carrier;
wherein the controller is in communication with both the antenna impedance tuner and the tunable filter and is configured for selectively tuning an impedance value of one or more of the one or more first variable impedance element or the one or more second variable impedance element.

22. A method for making a filtering antenna device, the method comprising:
integrating an antenna impedance tuner and a tunable filter on a common module carrier that is integrated onto a floor plan of a wireless device, the antenna impedance tuner having one or more first variable impedance element configured to selectively vary an impedance at a signal path output, and the tunable filter in communication between the signal path output of the tunable antenna and an output port configured for connection to a signal processing chain, the tunable filter having one or more second variable impedance element configured to provide a frequency-selective filtering response between the signal path output and the output port; and
connecting the signal path output of each of the individual modules with an antenna element.

* * * * *